United States Patent [19]

Shinoda et al.

[11] 4,434,668

[45] Mar. 6, 1984

[54] DETECTOR FOR USE IN MEASUREMENT OF FLOW SPEED OR FLOW RATE OF A FLUID

[75] Inventors: Kazuichi Shinoda; Masayoshi Katayama, both of Yokohama, Japan

[73] Assignee: Tokico Ltd., Kawasaki, Japan

[21] Appl. No.: 487,719

[22] Filed: Apr. 29, 1983

Related U.S. Application Data

[63] Continuation of Ser. No. 284,113, Jul. 16, 1981.

[30] Foreign Application Priority Data

Jul. 18, 1980 [JP] Japan ............................ 55-101442[U]

[51] Int. Cl.³ ................................................ G01F 1/32
[52] U.S. Cl. ................................. 73/861.22; 73/432 R
[58] Field of Search .......................... 73/861.22, 432 B

[56] References Cited

U.S. PATENT DOCUMENTS 3,007,340 11/1961 Kraftson ............................ 73/432 B
3,572,117 3/1971 Rodely ............................. 73/861.22
3,732,731 5/1973 Fussell, Jr. ....................... 73/861.22
4,047,432 9/1977 Fussell, Jr. ....................... 73/861.22

FOREIGN PATENT DOCUMENTS 2457967 2/1976 Fed. Rep. of Germany.
52-165650 12/1977 Japan.
53-19417 6/1978 Japan.
53-143360 12/1978 Japan.
53-143361 12/1978 Japan.

Primary Examiner—Charles A. Ruehl
Attorney, Agent, or Firm—Finnegan, Henderson, Farabow, Garrett & Dunner

[57] ABSTRACT

A detector for use in measurement of flow speed or flow rate of a fluid, comprising a bluff body disposed in a pipe, detection elements provided in the groove of the bluff body for detecting Karman's vortex streets shed by the bluff body, and a fluid passage for introducing the fluid pressure change resulted in the pipe by the Karman's vortex streets to the detection elements.

18 Claims, 6 Drawing Figures

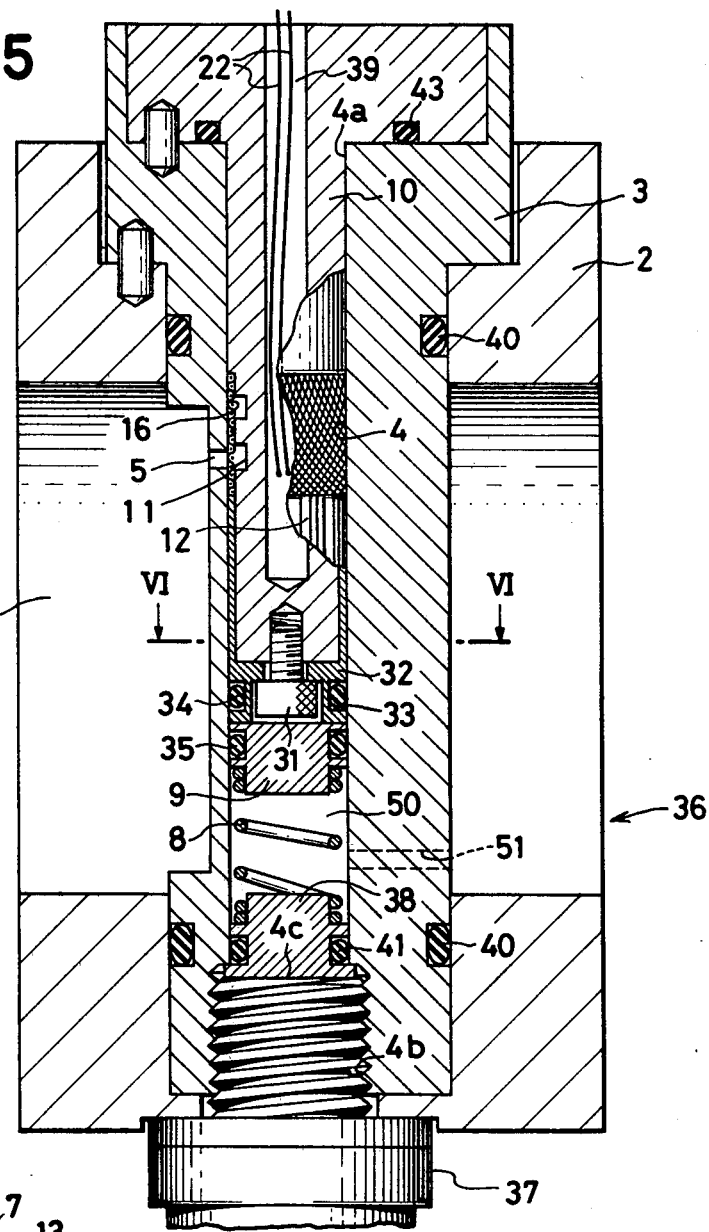
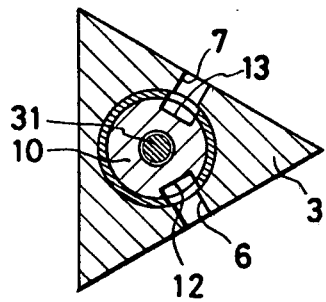

DETECTOR FOR USE IN MEASUREMENT OF FLOW SPEED OR FLOW RATE OF A FLUID

This application is a continuation of application Ser. No. 284,113, filed July 16, 1981.

This invention relates to a detector for use in measurement of flow speed or flow rate of a fluid in a flow channel based on the detection of the frequency or number of Karman's vortex streets shed by a bluff body disposed in the flow channel.

A flowmeter for measuring the flow speed or flow amount of fluid by detecting von Karman's vortex streets has been known. In the flowmeter of this type, since a detector used as the sensor is generally disposed directly in the flow channel or fluid passage, it is sensitive to the effects of dusts contained in the fluid. If the dusts deposit on detection elements mounted to the detector, the detection performance is degraded to impair accurate and sensitive detection. Thus, frequent maintenance is required for securing a certain detection performance for a long time. Moreover, flow of the fluid has to be interrupted during maintenance in the conventional detector, which requires much time and troublesome works. As a counter measure, it has been proposed to mount the detection elements outside of the flow channel and provide a fluid passage from the flow channel to the detection elements, but such an arrangement is disadvantageous in that the lengthy fluid passage is likely to cause cloggings.

This invention has been accomplished in view of the foregoings and the object thereof is to provide a detector for use in measurement of flow speed or flow rate capable of facilitating the maintenance and reducing the occurence of cloggings.

Another object of this invention is to provide a detector capable of conducting maintenance without discharging the fluid in the pipe.

A further object of this invention is to provide a detector capable of cleaning up the fluid passage therein and the detection elements with ease.

This invention is to be explained by way of its preferred embodiments in conjunction with appended drawings, by which the foregoing and other objects, as well as features of this invention will be made more clear; wherein FIG. 1 is a perspective view for a preferred embodiment according to this invention;

FIG. 5 is a cross sectional view of another preferred embodiment according to this invention; and FIG. 6 is a cross sectional view taken along line VI—VI shown in FIG. 5.

Figure 1:
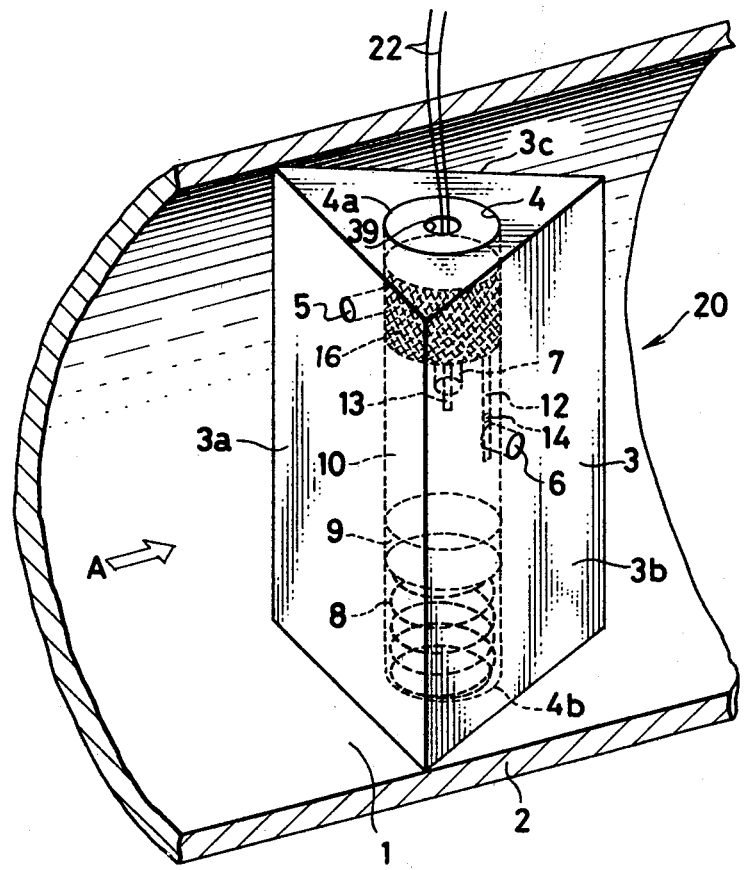
Figure 2:
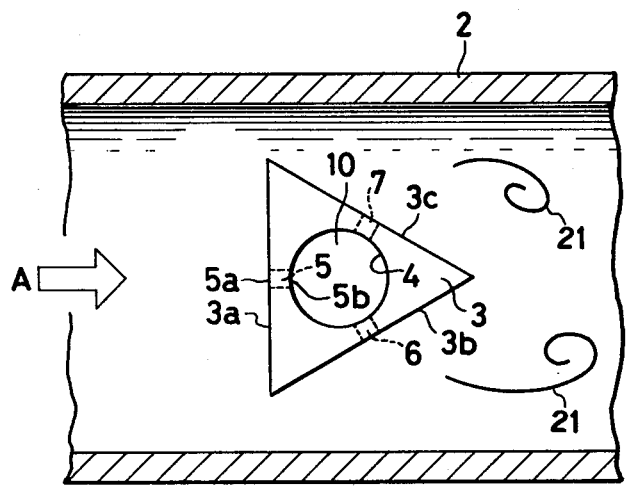
FIG. 2 is a plan view of the embodiment shown in FIG. 1.
Figure 3:
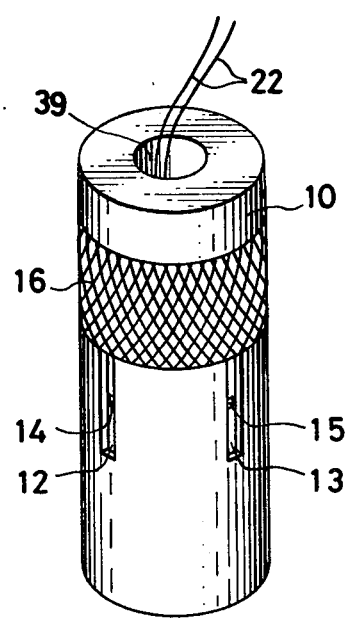
FIG. 3 is a perspective view of the embodiment in which a filter member is mounted to a cylindrical member.
Figure 4:
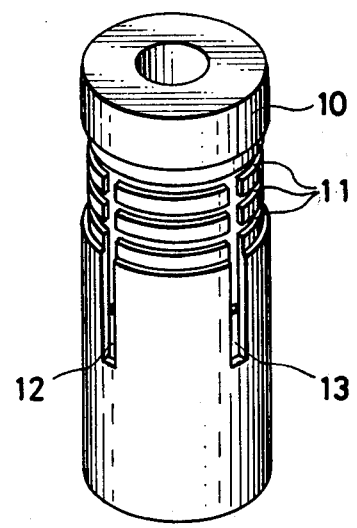
FIG. 4 is a perspective view of the cylindrical member.

In FIG. 1 to FIG. 4, a bluff body as a vortex generator which has a configuration of a triangular prism is disposed within a pipe 2 that defines a flow channel 1 or flow passage through which fluid to be measured, for example, gas or liquid flows. The bluff body 3 is provided with a cylindrical hollow portion 4, which opens at one end 4a to the outside of the pipe 2 and closed at the other end 4b. A through-hole 5 for the introduction of fluid is provided in the generator 3 for communicating the flow passage 1 with the hollow portion 4, one end 5a of the hole 5 being opened to the flow passage 1 about at the center in the upper portion on the front face 3a of the vortex generator 3 and the other end 5b of the hole 5 being opened to the hollow portion 4. On the downstream of the through-hole 5, symmetrical through-holes 6 and 7 for exit of fluid are provided in the vortex generator 3 for communicating the hollow portion 4 with the flow passage 1 on the downstream, the through-hole 6 being opened to the passage 1 about at the center on one side face 3b and the through-hole 7 being opened to the passage 1 about at the center on the other side face 3c of the vortex generator 3 respectively.

A coil spring 8 is contained in the lower portion of the hollow portion 4 and a disc-like movable member 9 is placed on the spring 8. In the hollow portion 4, an cylindrical member 10 is inserted on the movable member 9 and the spring 8 is compressed by way of the movable member 9 when the member 10 is inserted from the open end 4a to hollow portion 4. The member 10 is in close contact with the vortex generator 3 in the hollow portion 4. The member 10 is fixed by an adequate means to the vortex generator 3 so that the member 10 may not pop out upwardly from the vortex generator 3 by the expansive force of the spring 8. The cylindrical member 10 is also made detachable to the vortex generator 3. The member 10 is in a cylindrical configuration and formed at its circumferential surface with a plurality of annular grooves 11 and two parallel vertical grooves 12 and 13 as recesses. The grooves 11 to 13 are communicated to each other, in which detection elements 14 and 15 are mounted to the member 10 while disposed in the grooves 12 and 13 respectively, and a sheet-like filter member 16 is winded around the member 10 covering the grooves 11. The detection elements 14 and 15 comprise those elements, for example, pressure-sensitive elements that detect the pressure in the fluid to be measured in the grooves 12 and 13 and convert them into electrical signals. The pressure-sensitive elements as the elements 14 and 15 may, alternatively, be replaced with temperature sensitive elements such as thermistors, whereby the changes in the flow speed due to those in the fluid pressure may be detected based on the temperature changes of the element resulted from the changes in the heat amount discharging from the elements which is preheated. The through-holes 5 to 7 and the grooves 11 to 13 are so arranged that when the member 10 is inserted and set to a regular position in the hollow portion 4, either one of the grooves 11 opposes to the through-hole 5 for the introduction of fluid and the grooves 12 and 13 that situate below the positions, at which the detection elements 14 and 15 are disposed, are opposed to the through-holes 6 and 7 for the exit of fluid respectively. The hole 5 is communicated through the filter member 16 to the fluid passage defined with the groove 11 and the vortex generator 3, and the holes 6 and 7 are communciated with the fluid passage defined with the grooves 12 and 13 and the vortex generator 3 respectively.

In the dectector 20 for use in measurement of flow speed or flow rate having been constituted as above, when fluid flows in the direction shown by the arrow A, Karman's vortex streets 21 (hereinafter referred to as vortexes) are shed by the bluff body 3. When the vortexes 21 are shed by the vortex generator 3, the fluid pressure in the fluid passage between the hole 5 and the hole 6 through the grooves 11 and 12 and in the fluid passage between the hole 5 and the hole 7 through the grooves 11 and 13 changes in response to the generation of the vortexes 21. The pressure change is detected by the detection elements 14 and 15, and then outputted as electrical signals by way of lead wires 22 connected to the detection elements 14 and 15. In the detector 20, since the detection elements 14 and 15 are not directly exposed to the flow passage 1, deposition of dusts can be decreased. In addition, the filter member 16 disposed between the hole 5 and the groove 11 can prevent the dusts from flowing into the grooves 11 to 13 to substantially eliminate the cloggings in the grooves 11 to 13 and depositions of dusts to the detection elements 14 and 15. Further, exchange of the filter member 16 and the clean up for the grooves 11 to 13 and for the detection elements 14 and 15 can be conducted with ease by the extraction of the member 10 from the hollow portion 4 of the vortex generator 3. Furthermore, since the movable member 9 being biased by the spring 8 is situated above the hole 5 after the extraction of the member 10 from the hollow portion 4, fluid in the flow passage 1 can be prevented from leaking upwardly through the hollow portion 4 to the outside. Accordingly, extraction work for the member 10 can be made while flowing the fluid in the fluid passage 1.

In another embodiment of this invention, the lower portion of the member 10 may be formed as shown in FIG. 5 and FIG. 6. As specifically shown in FIG. 5 and FIG. 6, a cylindrical member for mounting a seal member 32 is attached by a thread member 31 to the lower end of the member 10 situated in the hollow portion 4, and an o-ring 34 as the seal member is engaged into the annular recess 33 of the member 32. The o-ring 34 is thus located between the bottom 4c of the hollow portion 4 and the hole 5. The o-ring 34 is in close contact with the vortex generator 3 in the hollow portion 4. Another o-ring 35 is mounted to the movable member 9 provided in close contact with the vortex generator 3 in the portion 4 and the o-ring 35 is also in close contact with the vortex generator 3.

In the detector 36 shown in FIG. 5 and FIG. 6, a support member 37 is threaded into the vortex generator 3 and the support member 37 closes one end 4b of the portion 4. A spring seat 38 is provided on the bottom 4c of the cavity 4, the bottom 4c being defined by the upper surface of the support member 37. A spring 8 is provided between the spring seat 38 and the movable member 9, and the spring 8 biases the members 10 and 32 toward the open end 4a of the portion 4. The member 10 is formed with a cavity 39 for leading the wires 22 from the detection elements 14 and 15 to the outside. Such an cavity 39 is also shown in the detector 20 as the first embodiment shown in FIG. 1 to FIG. 4. The vortex generator 3, the spring seat 38 and member 10 are provided with seal rings 40, 41 and 43 respectively. Other constitutions in the detector 36 are substantially the same as those in the detector 20.

In the detector 36 having been constituted as foregoings, since the o-ring 34 moves upwardly while keeping contact with the vortex generator 3 in the portion 4 upon extraction of the member 10 from the portion 4 of the vortex generator 3, the dusts deposited in the vortex generator 3 in the portion 4 are scraped off by the o-ring 34. Accordingly, the portion 4 can be cleaned up automatically upon extraction of the member 10 therefrom. In addition, upon extraction of the member 10 from portion 4, since the movable member 9 is also moved by the spring 8 toward the open end 4a and situated between the open end 4a and the hole 5, that is, situated at a position closer to the open end 4a than any of the holes 5, 6 and 7 after the member 10 has been extracted from the portion 4 of vortex generator 3, fluid in the flow passage 1 can be prevented from leaking externally through the holes 5, 6 and 7 and the portion 4. Upon insertion of the member 10 into the portion 4, when the ring 35 has passed over the holes 6 and 7, a substantially sealed space 50 is formed between the member 9 and the spring seat 38 in the portion 4 making it difficult to insert the member 10 further. However, a through-hole 51 adequately perforated in the vortex generator 3 for communicating the flow passage 1 and the space 50 enables the fluid to flow out through the through-hole 51, and the easy insertion of the member 10 is possible. The provision of such a through-hole 51 also facilitates the extraction of the member 10 and the upward and downward movement of the movable member 9.

Although this invention has been described with respect to the foregoing embodiments having the vortex generator of a prismatic configuration, this invention is no way limited to such embodiments but applicable also to those embodiments having any other configurations. In addition, the detection elements used herein may be one instead of two and, in this case, the hole for the exit of fluid and the vertical groove may be provided each by one corresponding thereto. Further, the annular groove 11 may be one instead of two or three. Furthermore, an additional cover may be provided in place of the movable member for closing the hollow portion 4 after the extraction of the member 10.

What is claimed is:

1. A detector comprising a generator for shedding vortex streets in a fluid, the generator having a hollow portion, a member inserted in the hollow portion in close contact with the generator and having a recess at a circumferential surface thereof, a through-hole for the introduction of fluid provided in the generator and opened to the hollow portion at the position of the recess, a through-hole for the exit of fluid provided in the generator and opened to the hollow portion at the position of the recess on the downstream of the through-hole for the introduction of fluid, an element for detecting the vortex, the element being provided on the member and disposed in the recess between the through-hole for the introduction of fluid and the through-hole for the exit of fluid, and a filter disposed between the through-hole for the introduction of fluid and the recess.

2. The detector of claim 1, in which the recess comprises an annular groove and a vertical groove communicated with the annular groove, the through-hole for the introduction of fluid is opened to the hollow portion at the position of the annular groove, and the through-hole for the exit of fluid is opened at the position of the vertical groove.

3. The detector of claim 2, in which the annular groove is covered with the filter.

4. The detector of claim 2, in which the vortex detecting element is disposed in the vertical groove.

5. The detector of claim 2, wherein the vertical groove comprises two groove channels disposed in parallel to each other, two through-holes for the exit of fluid are provided in the generator, and the through-holes for the exit of fluid are opened to the hollow portion at the position of the vertical grooves respectively.

6. The detector of claim 1, in which the filter member is detachably mounted to the member.

7. The detector of claim 1, which further comprises an o-ring provided on one end of the member situated in the hollow portion, the o-ring being in close contact with the generator.

8. The detector of claim 7, in which the o-ring is situated between the bottom of the hollow portion and the through-hole for the exit of fluid.

9. The detector of any one of claims 1 to 8, which further comprises a movable member provided between the bottom of the hollow portion and the member situated in the hollow portion and a resilient member provided between the movable member and the bottom of the hollow portion for biasing the movable member toward the open end of the hollow portion, the movable member being situated by the resilient member at a position closer to the open end of the hollow portion than any of the through-holes for the introduction and exit of fluid when the member having the the recess is detached from the generator and operable to prevent the fluid from leaking out of the open end of the hollow portion when the member having the recess is detached from the generator.

10. The detector of claim 9, in which the movable member is provided with an o-ring which is in close contact with the generator.

11. The detector of claim 1, in which the detecting element is a pressure sensitive element.

12. The detector of claim 1, in which the detecting element is a temperature sensitive element.

13. A detector comprising a generator for shedding vortex streets in a fluid, the generator having a hollow portion, a member inserted in the hollow portion in close contact with the generator and having a recess at a circumferential surface thereof, a through-hole for the introduction of fluid provided in the generator and opened to the hollow portion at the position of the recess, a through-hole for the exit of fluid provided in the generator and opened to the hollow portion at the position of the recess on the downstream of the through-hole for the introduction of fluid, an element for detecting the vortex, the element being provided on the member and disposed in the recess between the through-hole for the introduction of fluid and the through-hole for the exit of fluid, a movable member provided between the bottom of the hollow portion and the member situated in the hollow portion and a resilient member provided between the movable member and the bottom of the hollow portion for biasing the movable member toward the open end of the hollow portion, the movable member being situated by the resilient member at a position closer to the open end of the hollow portion than any of the through-holes for the introduction and exit of fluid when the member having the recess is detached from the generator and operable to prevent the fluid from leaking out of the open end of the hollow portion when the member having the recess is detached from the generator.

14. The detector of claim 13, in which the member having the recess is provided with an o-ring on one end thereof situated in the hollow portion, the o-ring being in close contact with the generator.

15. The detector of claim 13, in which the movable member is provided with an o-ring which is in close contact with the generator in the hollow portion.

16. The detector of any one of claims 13 to 15, in which the detecting element is a pressure sensitive element.

17. The detector of any one of claims 13 to 15, in which the detecting element is a temperature sensitive element.

18. A detector comprising a generator for shedding vortex streets in a fluid, the generator having a hollow portion, a member inserted in the hollow portion in close contact with the generator and having a recess at the circumferential surface thereof, a through-hole for the introduction of fluid provided in the generator and opened to the hollow portion at the position of the recess, a through-hole for the exit of fluid provided in the generator and opened to the hollow portion at the position of the recess on the downstream on the through-hole for the introduction of fluid, and an element for detecting the vortex, the element being attached to the member in the recess between the through-hole for the introduction of fluid and the through-hole for the exit of fluid.

* * * * *